United States Patent
Staggs et al.

[11] Patent Number: 6,131,594
[45] Date of Patent: Oct. 17, 2000

[54] GAS CARTRIDGE ACTUATED ISOLATION VALVE

[75] Inventors: William A. Staggs; John E. Going, both of Kansas City, Mo.

[73] Assignee: Fike Corporation, Blue Springs, Mo.

[21] Appl. No.: 09/373,087

[22] Filed: Aug. 12, 1999

Related U.S. Application Data

[63] Continuation-in-part of application No. 09/133,573, Aug. 13, 1998, abandoned.

[51] Int. Cl.[7] .................................................. F16K 17/14
[52] U.S. Cl. .............................. 137/1; 137/67; 137/68.13; 251/327; 251/64
[58] Field of Search .................................. 137/67, 68.13, 137/10; 251/326, 62, 327, 64

[56] References Cited

U.S. PATENT DOCUMENTS

| | | | |
|---|---|---|---|
| 3,358,961 | 12/1967 | Montgomery et al. | 137/68.13 |
| 3,373,758 | 3/1968 | Boutwell et al. | 137/68.13 |
| 3,720,620 | 3/1973 | Taber | 252/107 |
| 3,739,796 | 6/1973 | Jablansky | 137/68.13 |
| 4,108,195 | 8/1978 | Berry | 137/68.13 |
| 4,215,749 | 8/1980 | Dare et al. | 137/68.13 |
| 4,290,578 | 9/1981 | Earp et al. | 137/68.13 |
| 4,794,890 | 1/1989 | Richeson, Jr. | 251/64 |
| 5,362,028 | 11/1994 | Jacobs . | |
| 5,853,018 | 12/1998 | DeLand et al. | 251/64 |

*Primary Examiner*—Gregory L. Huson
*Assistant Examiner*—Joanne Y. Kim
*Attorney, Agent, or Firm*—Hovey, Williams Timmons & Collins

[57] ABSTRACT

An isolation gate valve (10, 10a, 10b, 124, 146, 210) is provided which has a valve body (12, 126, 212) presenting a passageway (14, 214) therethrough; a shiftable, apertured gate member (18, 224) is located within the body (12, 126, 212) and is shiftable between a valve open position permitting flow through the passageway (14, 214) and a valve closed position wherein the member (18, 224) is shifted into a flow-blocking relationship relative to the passageway (14, 214). A valve actuator (20, 130, 220) is provided which includes a gas-generating cartridge unit (22, 22a, 22b, 222) which, upon actuation, generates a charge of high pressure subsonic gas for shifting the gate member (18, 224) at a velocity of about 0.2 to about 0.33 in./msec. Preferably, the actuator includes a piston housing (56, 56a, 56b, 256) having a piston (72, 72a, 72b, 272) therein with a piston rod (71, 71a, 71b, 271) coupled between the piston (72, 72a, 72b, 272) and the gate member (18, 224). In the valve open position, the piston (72, 72a, 72b, 272) is adjacent the cartridge unit (22, 22a, 22b, 222) and is oriented so that the pressurized gas from the cartridge unit (22, 22a, 22b, 222) shifts the piston (72, 72a, 72b, 272) thereby closing the valve (10, 10a, 10b, 124, 146, 212). A dampener unit (99, 299) is provided in a association with the gate member (18, 224) to effect predetermined, controlled deceleration thereof as the gate member approaches its fully actuated position.

14 Claims, 5 Drawing Sheets

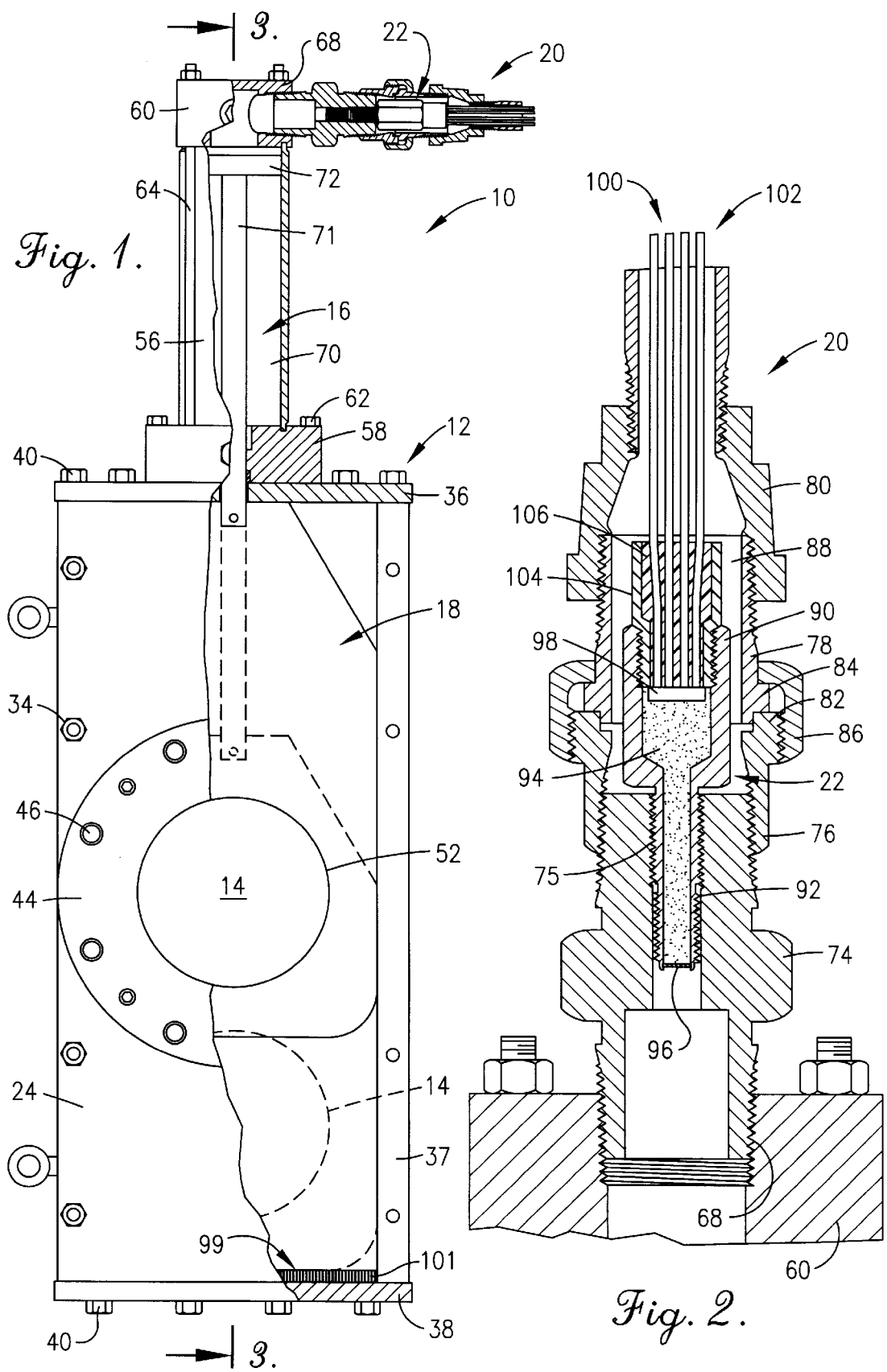

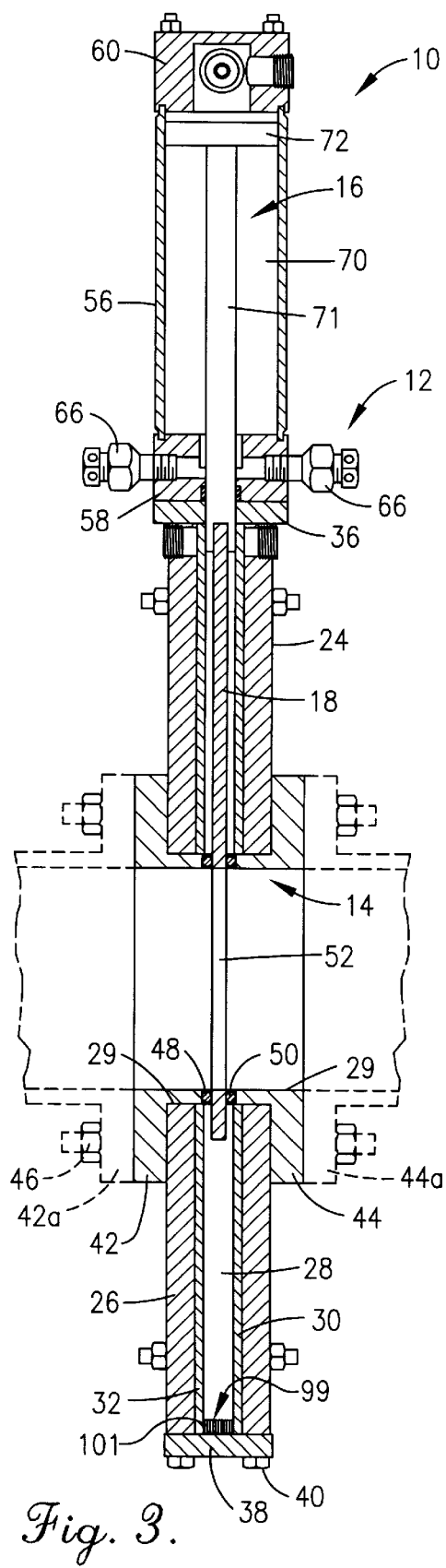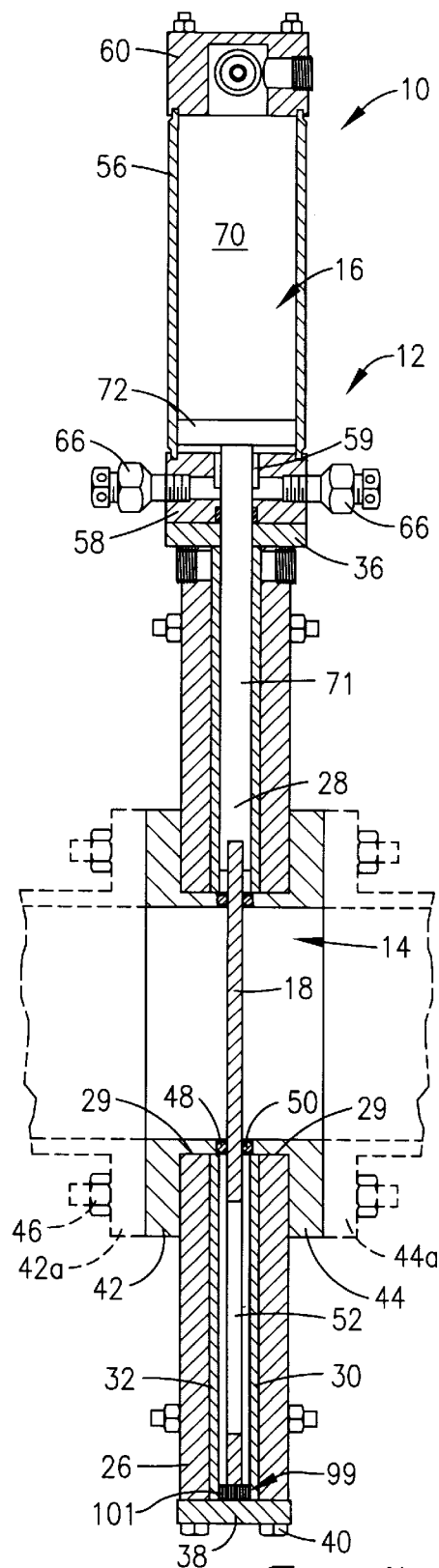
Fig. 3.
Fig. 4.

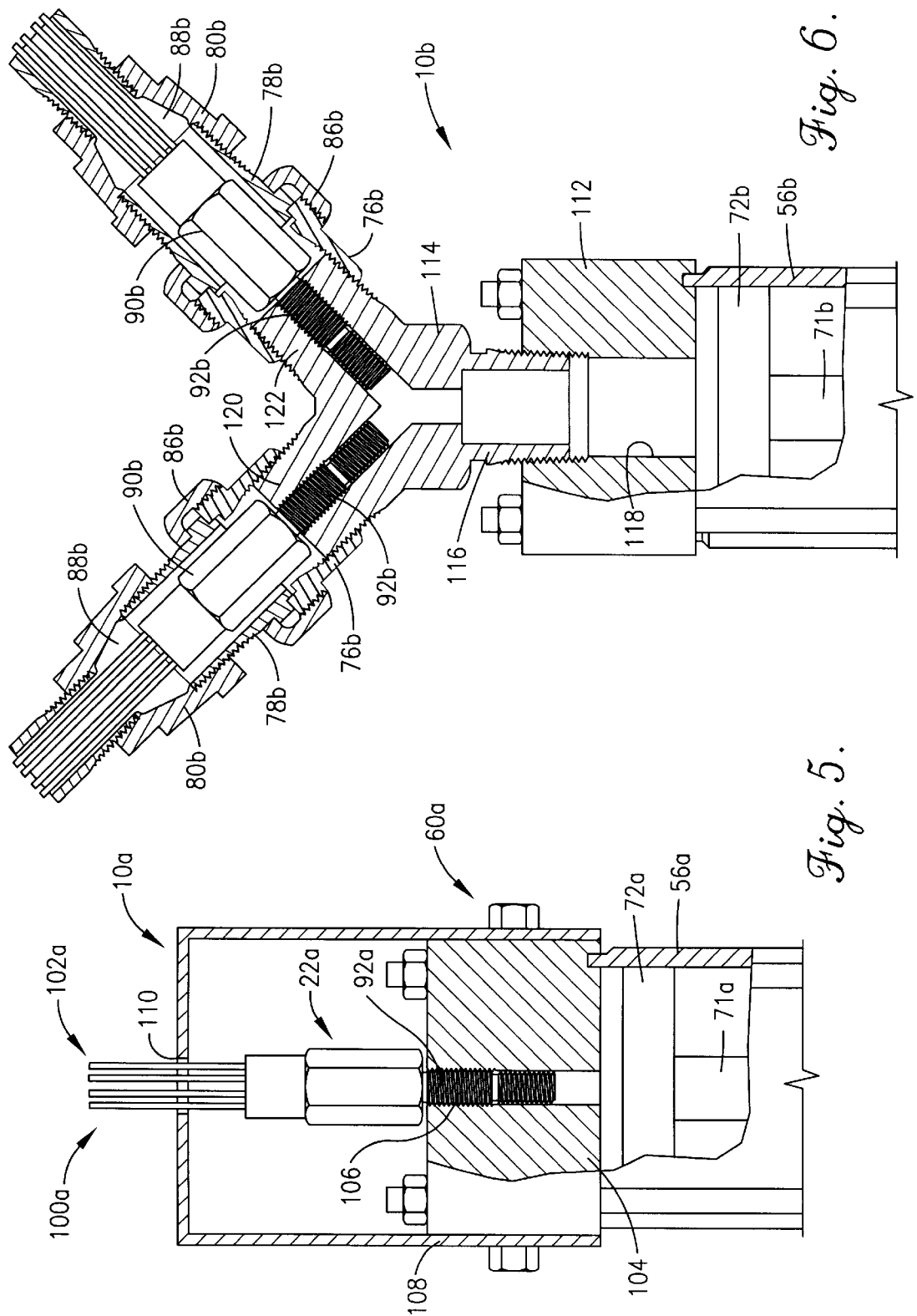

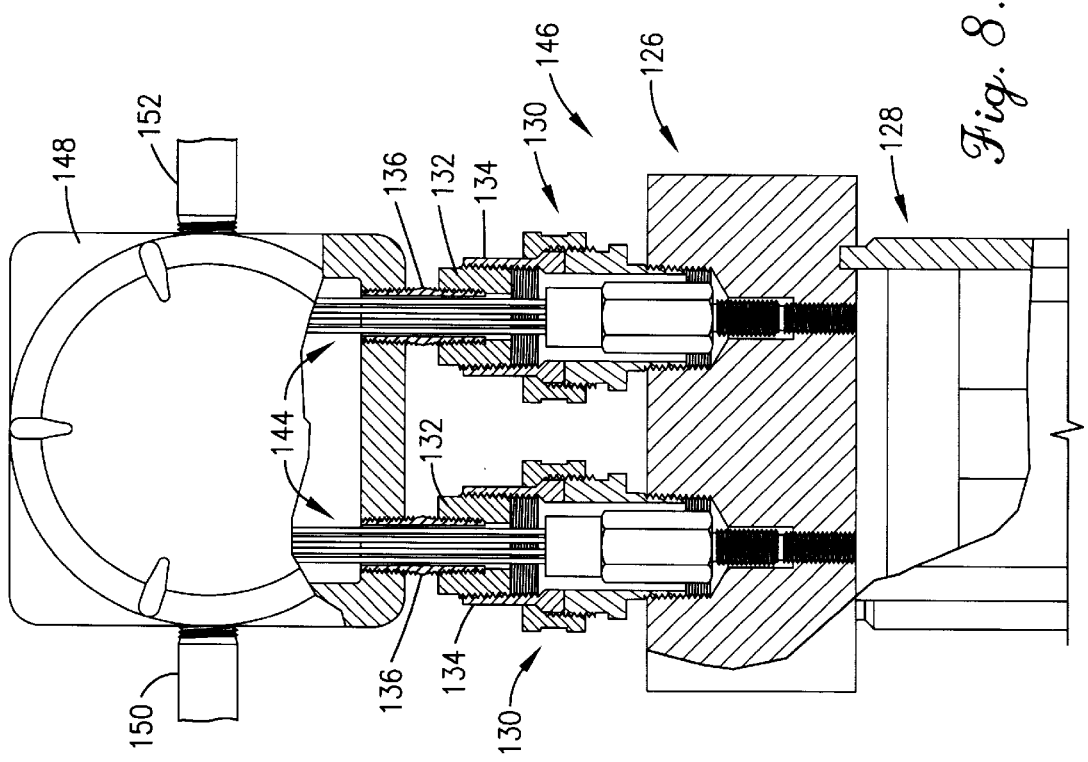
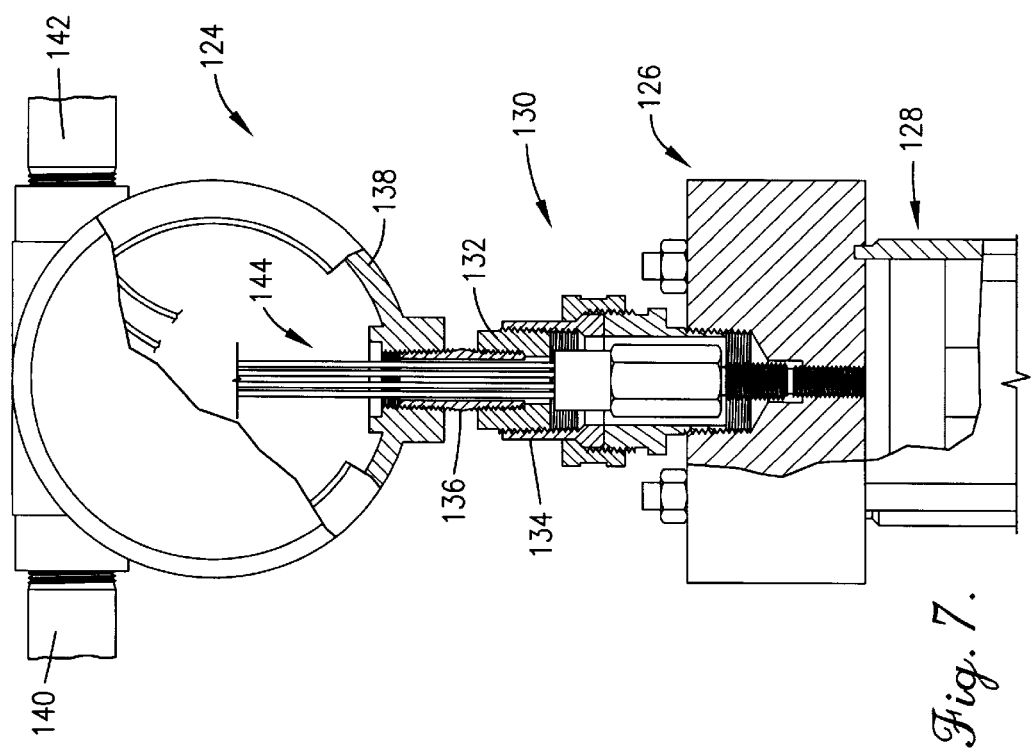

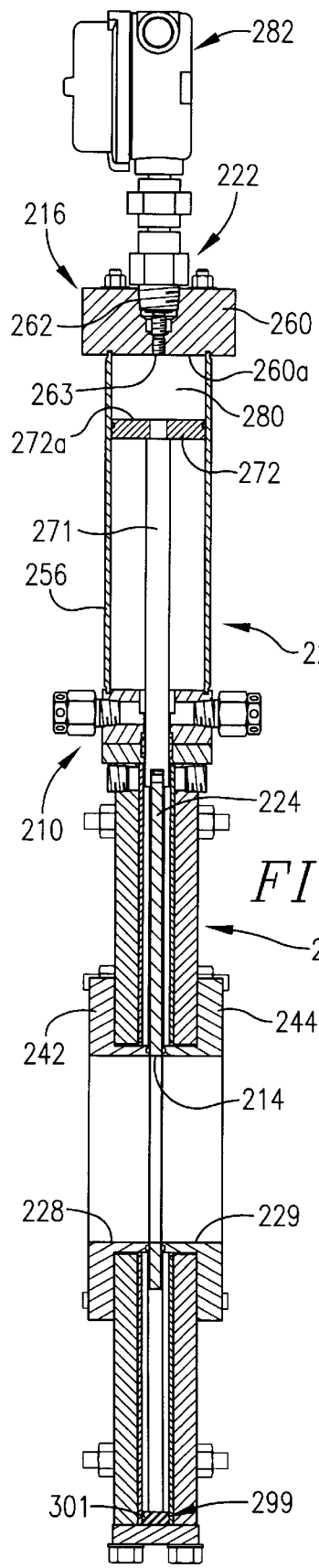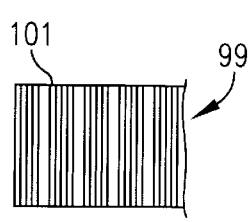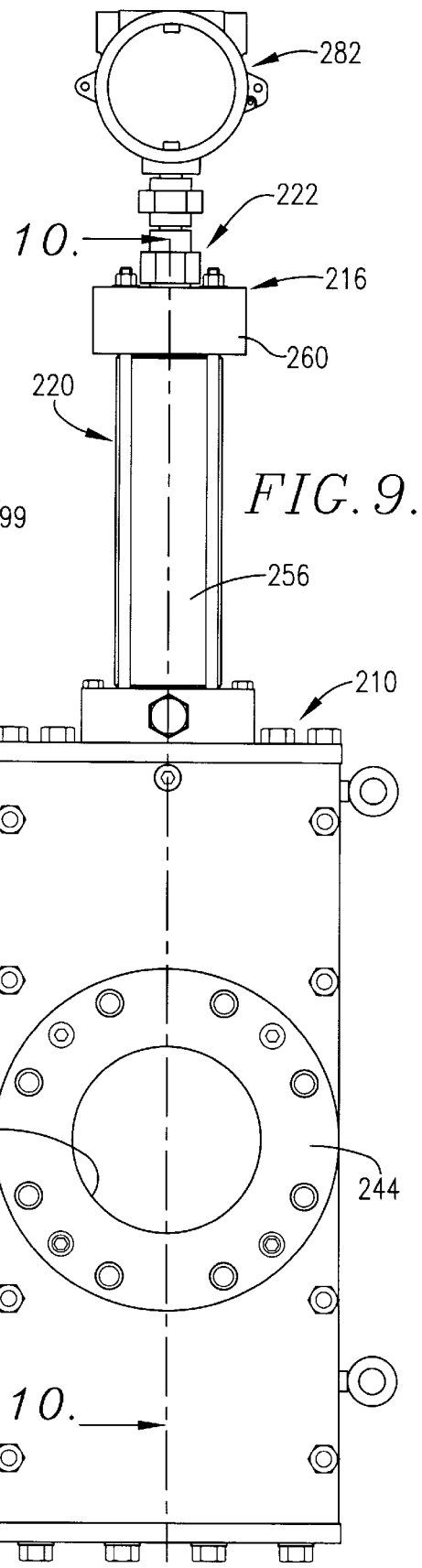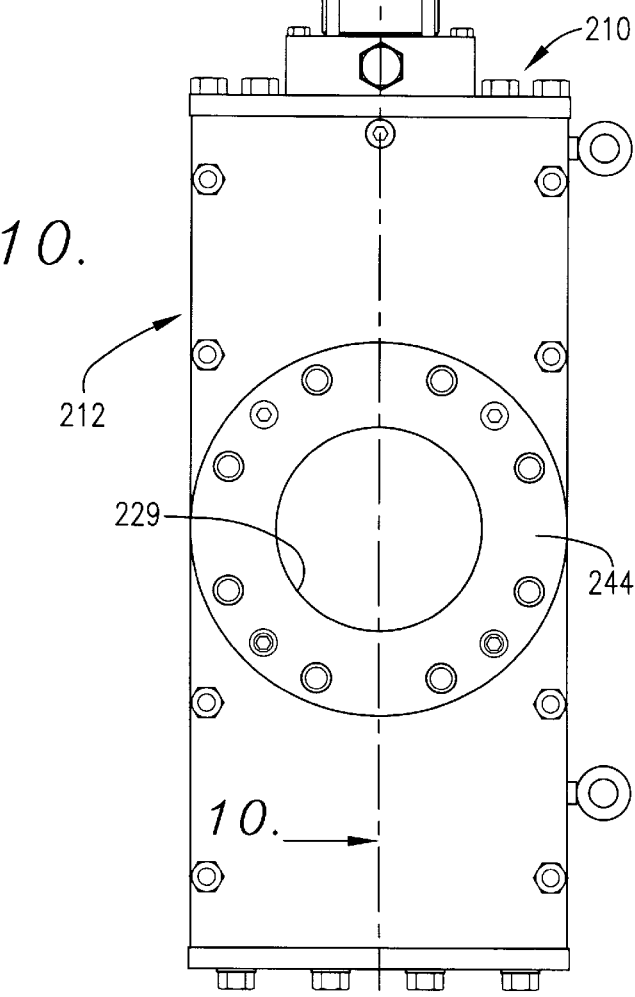

GAS CARTRIDGE ACTUATED ISOLATION VALVE

RELATED APPLICATIONS

This application is a continuation-in-part of U.S. patent application No. 09/133,573 filed Aug. 13, 1998, now abandoned both of which are entitled GAS CARTRIDGE ACTUATED ISOLATION VALVE.

BACKGROUND OF THE INVENTION

1. Field of the Invention

This invention relates to improved gate valve apparatus of the type commonly used in association with chemical processes or the like which may experience a hazard condition or upset requiring rapid valve actuation to prevent a catastrophic failure. More particularly, the invention relates to a gate valve apparatus provided with an actuator which generates a gas discharge at a subsonic flow rate in order to rapidly and smoothly shift a valve member for actuation of the gate valve apparatus. Structure is also provided in association with the valve member to control the rate of deceleration of the gate valve.

2. Description of the Prior Art

Isolation-type gate valves have long been provided with chemical reactor apparatus for the purpose of allowing rapid shutdown of the reactor in the event of generation of hazardous conditions. In general, such gate valves include a valve body which presents a passageway therethrough, with a shiftable, apertured valve member within the body and normally located in a valve open position allowing flow through the valve. The valve member is shiftable to a flow-blocking valve closed position when a hazardous condition is sensed.

The actuators associated with prior gate valves have included mechanical linkages operated by motors or solenoids for example. However, in some instances prior actuators are unable to actuate a gate valve with sufficient rapidity to prevent flame propagation, actual passage of a flame through the gate, explosion, or some other significant failure. Additionally, in some contexts, it is desirable to avoid generation of electrical sparks which may occur with motor driven gate valve assemblies.

U.S. Pat. No. 3,358,961 of Dec. 19, 1967, represents another type of gate valve for releasing pressure in a fluid flow system. In this instance, a sliding valve is operated by an explosive charge producing a supersonic shock wave for extreme accelerated shifting of the valve body from a normally closed position to a fully opened location. The shutter-type valve is useful only for relatively small orifice applications involving a similarly limited size valve assembly. The valve body and associated shutter plate and piston assembly must be small enough that no damage is caused to the valve components by shock waves generated upon actuation of the explosive device, or as a result of inertia upon impact of the shutter plate with the housing assembly during valve closing.

Accordingly, there is a need in the art for an improved isolation gate valve assembly, and a corresponding method of gate valve operation, which avoids the problems of prior valve actuators.

SUMMARY OF THE INVENTION

Gate valves of the type in which the present invention is most useful are generally employed to either close off a tubular passage upon actuation, or to open that passageway. Generally, the aperture of the gate valve, which is either closed by the gate, or is opened upon shifting of the gate, is essentially of the same cross-sectional dimensions as the passageway. For example, if the passage is defined by an 8-inch pipe, the aperture in the gate valve should also have a diameter of 8 inches.

The present invention provides an improved isolation gate valve assembly which is especially useful in a wide variety of sizes of gate valves, in which the aperture therethrough can be anywhere from about 2 inches up to as much as 24 inches or more. The isolation valve has particular utility in larger size applications involving pipes having a diameter of 6 inches or more.

In common with prior gate valves, those of the invention include a valve body presenting a passageway therethrough, a gate unit including a shiftable, apertured gate member proximal to the passageway and shiftable from a valve open position wherein the valve member aperture is in registry with the valve passageway, and a valve closed position wherein the gate member aperture is out of registry with the passageway. The improved actuator of the invention has components which function to rapidly shift the gate valve at a predetermined, controlled acceleration between the positions thereof, i.e., from the valve open to the valve closed position, or from the valve closed to the valve open position, and to control the deceleration of the gate member in a predetermined manner as it approaches it open or closed position. A gas-generating cartridge unit is provided to generate a subsonic charge of pressurized gas to selectively open or close the gate member as the case may be. The gate member is responsive to such pressurized gas for shifting thereof at a velocity of from about 0.2 in. to about 0.33 in./msec, depending upon the size of the gate valve with the time of actuation within the preferred range being a function of and longer in time for larger pipe diameters. Significantly faster closing times can cause damage to valve components as a result of impact of the gate valve with the housing for the gate valve, and slower closing can cause the valve to fail in its function of preventing flame fronts or gaseous production of combustion from the source of the deflagration to an unprotected area.

In preferred forms, the actuator includes a tubular housing, a piston shiftable within the housing and having an elongated piston rod coupled between the piston and the gas member. A gas-generating cartridge is connected to the tubular housing in disposition defining an expandable pressurized gas-receiving chamber between the piston and the gas discharge end of the cartridge. The gas-generating cartridge unit is located for directing a charge of subsonic pressurized gas into the housing and against the face of the piston remote from the rod to thereby shift the piston within the housing and correspondingly shift the gate member.

The preferred gas-generating cartridge unit is in the form of an elongated cartridge body oriented in either a transverse or aligned relationship with the housing and having an outlet; the cartridge has a quantity of solid, ignitable propellant within the chamber which upon ignition burns at a controlled rate producing a flow of pressurized gaseous products of combustion which flow into the chamber at a rate that does not exceed a velocity of about mach 1. An appropriate ignitor and electrical lead structure extend from the chamber and are operably coupled with the propellant for ignition thereof. Either single or multiple gas-generating cartridge units may be used as required for a particular application.

A dampener unit is associated with the gate valve in a location to be engaged by the valve as it reaches its closed position to provide controlled deceleration of the gate valve, thereby preventing bouncing of the valve and also guard against untoward impact forces being directed to the housing for the valve by the gate valve body itself. In the case of gate valve apparatus of this invention intended for use in piping which is 8 in. in diameter or less, the dampener unit may be an elastomeric member of predetermined dampening characteristics. Where the gate valve apparatus is to be used in piping of 10 in. or greater in diameter, a preferred dampener unit comprises honeycomb cellular structure where the force is received axially of the cells thereby resulting in controlled collapsing of the force dampening structure.

It has been found that isolation gate valves in accordance with the invention provide safe, rapid valve actuation without the expensive and sometimes dangerous features of prior art actuators.

BRIEF DESCRIPTION OF THE DRAWINGS

FIG. 1 is a fragmentary view in partial vertical section illustrating one form of an isolation gate valve assembly in accordance with the invention, with the valve open and valve closed positions of the gate member shown in full line and phantom, respectively;

FIG. 2 is an enlarged sectional view depicting in detail the preferred gas-generating cartridge unit forming a part of the valve assembly of FIG. 1;

FIG. 3 is a vertical sectional view taken along line 3—3 of FIG. 1 and illustrating the valve gate member in the valve open position thereof;

FIG. 4 is a vertical sectional view similar to that of FIG. 3, but depicting the valve gate member in the valve closed position thereof;

FIG. 5 is a fragmentary view in partial section with parts broken away illustrating another embodiment in accordance with the invention, wherein the gas-generating cartridge unit is oriented in axial alignment with the valve assembly gate member;

FIG. 6 is a fragmentary view in partial section with parts broken away illustrating another embodiment of the invention, wherein a pair of gas-generating cartridge units are employed;

FIG. 7 is a fragmentary view in partial section depicting another embodiment of the invention, using a housing-type enclosure disposed about the ignition leads for the gas-generating cartridge unit;

FIG. 8 is a fragmentary view in partial section depicting another embodiment of the invention, employing a pair of gas-generating cartridge units with a housing-type enclosure around the ignition leads thereof;

FIG. 9 is a front elevational view of a preferred form of the isolation gate valve assembly in accordance with the invention;

FIG. 10 is a vertical, cross-sectional view taken substantially along the line 10—10 of FIG. 9 and looking in the direction of the arrows;

FIG. 11 is a fragmentary side elevational view of one type of dampener unit usable with larger size gate valve apparatus and comprising a collapsible cellular dampener element; and FIG. 12 is a fragmentary plan view of the dampener unit shown in FIG. 11.

DETAILED DESCRIPTION OF THE PREFERRED EMBODIMENTS

Turning now to the drawings and particularly FIGS. 1–4, one form of an isolation gate valve assembly in accordance with the present invention and designated by the numeral 10 is illustrated in these figures. The valve assembly 10 broadly includes a valve body 12 presenting a flow passageway 14 therethrough and a gate unit 16 within the housing 12, the unit 16 having a shiftable, apertured, plate-type gate member 18. An actuator 20 also forms a part of the assembly 10, and comprises a gas-generating cartridge or unit 22.

In more detail, the valve body 12 includes a pair of upright, spaced apart, rectangular body stud interference plates 24, 26 cooperatively defining an upright internal chamber 28 and each having a relatively large circular opening 29 therethrough. Each of the plates 24, 26 has a steel liner 30, 32 (preferably 10 gauge steel) secured to the inner face thereof. The plates 24, 26 are interconnected by means of marginal couplers 34 extending into sidewalls 37. In addition, sidewalls 37, top and bottom plates 36, 38 are attached to the upper and lower ends of the plates 24, 26 and sidewalls 37 via connectors 40. A pair of annular flanges 42, 44 are mounted to the plates 24, 26 about the openings 29 in order to define the passageway 14. These flanges 42, 44 are adapted to mate with pipe flanges 42a, 44a illustrated in phantom in FIGS. 3–4. Threaded studs 46 on each side serve to connect the flanges 42, 42a, 44, 44a in place on the valve body 12. It will be observed that each of the flanges 42, 44 is provided with an innermost circular sealing ring 48, 50 (FIGS. 3 and 4).

The gate unit 16 includes the elongated, upright, metallic gate member 18 which is situated within the chamber 28 and is designed for up and down shifting movement therein. As shown, the plate member 18 has a circular aperture 52 therethrough which is of the same size as plate openings 29 and passageway 14. As those skilled in the art will appreciate the gate member 18 is shiftable between a valve open position (FIG. 3) wherein the aperture 52 is in registry with the passageway 14, and a valve closed position (FIG. 4), wherein the gate member 18 is shifted downwardly within passageway 28 so that the aperture 52 is fully out of register with passageway 14, thus blocking flow therethrough.

The actuator 20 includes an upright, tubular piston cylinder 56 having a base 58 having a vertical through-bore 59, as well as an annular top fixture 60. The base 58 is secured to plate 36 via screws 62, whereas the top fixture 60, surmounting the upper end of cylinder 56, is attached to the base 58 by means of long shank connectors 64. The base 58 is equipped with a pair of conventional, threadably secured venting mufflers 66 which communicate with through-bore 59. The top fixture 60 has threaded bore 68 designed to receive the cartridge unit 22 as will be described. The cylinder 56, base 58 and top fixture 60 cooperatively define an internal piston chamber 70. An elongated piston rod 71 is secured to the upper end of gate member 18 and extends through the bore 59 into chamber 70. A circular piston 72 is secured to the uppermost end of rod 71 as shown, and is slidable within the chamber 70.

The gas-generating cartridge or unit 22 is threadably received within bore 68 of fitting 60, and is illustrated in detail in FIG. 2. Specifically, the cartridge unit 22 has a tubular outlet section 74 which is externally threaded for receipt within the bore 68 and has internal threading 75 as well, an annular, threaded transition piece 76, an intermediate, annular body part 78, and a rearmost terminal part 80. As shown, the transition piece 76 is threadably coupled to the rearward end of section 74 and presents a shoulder 82; the forward end of body part 78 has a complemental shoulder 84 abutting the shoulder 82. A threaded annular clamp 86 is employed to clamp the body part 78 against transition piece 76. The rearward end of intermediate part 78 is threaded as shown, and receives the forward end of terminal part 80. It will thus be seen that the components 74–80 cooperatively define an elongated, tubular cartridge-like body defining an internal chamber 88.

A tubular propellant body 90 having an elongated, externally threaded extension 92 is received within chamber 88 and is coupled to threading 75 of outlet section 74. The body contains solid propellant 94 preferably in the form of granules of smokeless powder. Advantageously, the powder is a conventional formulation comprising a mixture of potassium perchlorate, nitroglycerin, nitrocellulose and lead thiocyanate having minimum auto-ignition temperature of about 325° F. and a DOT classification of 1.4 s and a UN classification of 0323. The smokeless powder should be adequate to generate gaseous products of combustion to operate the valve assembly 10 as described below. The forward end of the extension 92 is fitted with a consumable closure disc 96; the disc 96 preferably comprises a thin circular plastic or resin element which protects the smokeless powder charge from exposure to the atmosphere during distribution and storage of the cartridge unit 22.

An ignition disc 98 is positioned within the body 90 in contact with the propellant 94. The disc is preferably made up of an ignition composition comprising primarily potassium perchlorate. Two pairs of electrical ignition leads 100, 102 are operably coupled with the disc 98 and extend rearwardly out of the cartridge body as shown. A tubular lead guide 104, having an internal liner 106, is threaded into the rearward end of body 90. Each such pair comprises two metallic bridge wire elements in contact with the rearward face of the disc 98. This preferred embodiment is a design for a retrofit. Alternatively, a design for a new installation may differ slightly.

Viewing FIGS. 1, 3 and 4 of the drawings, a dampener unit broadly designated 99 is supported by bottom plate 38 in direct alignment with the slidable gate member 18 and in disposition to be engaged directly by the lower edge of the gate member. The dampener unit embodiment illustrated in FIG. 1 and shown in greater detail in FIGS. 11 and 12, comprises a honeycomb cellular element 101 having a number of hexagonal cells 103 arranged with the longitudinal axes thereof extending in parallel relationship to the path of sliding movement of the gate member 18. In a preferred embodiment, the cells 103 are formed of 0.010 in. thick 304 stainless steel, with the flat-to-opposed flat dimension of the individual cells being approximately ⅛ in. The height and width of the cellular element 101 is preferably about 1"×1", with length thereof being dependent upon the transverse width of the gate member 18 of a specific size of gate valve apparatus. The dampener unit 99 is preferably used in gate valve apparatus for piping having a diameter of 10 in. or greater.

An alternative dampener unit 299 is illustrated in FIG. 10 of the drawings, and comprises an elastomeric element 301 comprising a strip of elastomer that is desirably about 1"×1" in height and width, and also of a length approximately equal to the transverse dimension of the gate member 18 of a particular gate valve apparatus. A preferred element 301 is of neoprene having a Shore A hardness of about 60 to about 70.

Further details of the preferred type of gas-generating cartridge or unit can be found in U.S. Pat. No. 5,718,294 incorporated by reference herein.

In the use of valve assembly 10, the gate member 18 is normally in the valve open position shown in FIG. 3 where the valve member is in its elevated position with aperture 52 thereof in registry with passageway 14, and with piston 72 in its uppermost position slightly below the top fixture 60. In such orientation, the seals 48, 50 prevent passage of fluid into the chamber 28 of the valve. In the event that a hazard is detected by a sensor (not shown), an appropriate current is introduced into the ignition leads 100, 102 so as to actuate the disc 98. This causes rapid ignition of the propellant 94, resulting in generation of hot products of combustion. This serves to initially generate pressure within fitting 60 above piston 72. Consequently, the piston 72 is driven rapidly downwardly within the cylinder 56 as viewed in FIG. 4 and the plate member 15 is likewise shifted downwardly until the aperture 52 is fully out of communication with passageway 14, thereby closing the latter and preventing any additional fluid flow therethrough.

The cartridge or unit 22 has a gas generating propellant in which the formulation, burn rate, and quantity are correlated to produce a sufficient volume of subsonic gas at a velocity which causes the gate valve 18 to be shifted toward its closed position at a velocity of from about 0.2 to about 0.33 in./msec. Stated another way, the propellant charge is of characteristics such that the velocity profile for each size of gate valve during shifting meets the criteria of moving from its fully opened position to its fully closed position in about 3 to about 5 msec for each inch of pipe diameter in which the gate valve assembly is to be mounted. Thus, for example, in the case of gate valve apparatus intended for use in piping having a diameter of 10 in., the closing time of the gate valve member 18 should be no slower than about 50 msec, and no faster than about 30 msec.

Controlled acceleration of the gate valve member 18 during opening thereof prevents the gate valve member from impacting against components of the housing thereof with sufficient force to cause damage to the components, and from bouncing to an extent that the valve aperture 14 could reopen. Avoidance of reopening of the valve member 18 is especially important in those instances where the gate valve apparatus of this invention is used in an explosion isolation system. If the piping in which the gate valve apparatus is mounted leads to an area where an explosion can occur, adverse events that must be avoided include failure of the valve to close rapidly enough to prevent a flame front or deflagration products from advancing through the valve before closure thereof takes place, and reopening of the valve to any extent that would permit the flame or deflagration products from escaping through the valve that should otherwise be fully closed.

The dampener unit 99 or 299 in a particular size of gate valve apparatus, depending upon the diameter of the piping in which the apparatus is mounted, contributes to avoidance of deleterious impact forces being imparted to the housing of the gate valve apparatus when the gate valve member 18 reaches its fully closed position. Engagement of the gate valve with the dampener unit 99 or 299 decelerates shifting of the gate valve member in a predetermined, controlled manner thus preventing transfer of damaging impact forces to the housing from the gate valve member 18 during closure, and at the same time precluding bouncing of the gate valve element to an extent that the aperture 14 could reopen.

In the case of elastomeric dampener unit 299, the characteristics of that unit are such that deceleration of the gate member 18 is fully and rapidly accomplished, but the unit 299 is not so elastic that it tends to cause the gate valve member 18 to bounce, either once or repeatedly, and thus move away from its full closed position. The preferred neoprene material used in fabricating dampener unit 299 has a Shore A hardness of about 60 to about 70, which has been found to provide smooth and essentially bounce-free dampening of the gate valve member 18 as it is shifted toward its closed position.

Gate valve apparatus or assemblies 10 designed for use in piping having a diameter of 10 in. or greater preferably employ the honeycomb cellular structure 101 illustrated in FIGS. 1, 11 and 12, wherein the structure 101 is oriented such that the axes of the individual cells 103 are parallel to the path of travel of the gate valve member 18 as it closes. Engagement of the gate valve member 18 with the adjacent face of the honeycomb structure causes the cells to progressively collapse in a controlled manner, thus providing controlled and progressive deceleration of the gate valve member 18.

FIG. 5 illustrates a modified valve assembly 10a which is identical with assembly 10, except that the top fitting 60a is designed to receive and position the cartridge unit 22a in an upright orientation in substantial axial alignment with piston rod 71a and the underlying valve gate member (not shown). Thus, the fitting 60a includes a lower most threaded plug section 104 surmounting the cylinder 56a. The plug 104 has an internally threaded bore 106 receiving the threaded extension 92a of the cartridge unit 22a. A metallic, cup-like cover 108 is secured to the section 104 and has small openings 110 through the upper wall thereof for passage of the ignition leads 100a, 102a. As will be readily appreciated, the operation of the assembly 10a is in all respects identical with that described with reference to valve assembly 10.

FIG. 6 illustrates yet another embodiment in the form of valve assembly 10b. In this case, a tubular top fitting 112 is operatively attached to the upper end of the housing 56b. A yoke coupler 114 having an externally threaded tubular mounting section 116 is received within the threaded bore 118 of the fitting 112. As shown, the coupler 114 includes a pair of diverging tubular arms 120, 122 which are each the equivalent of the outlet section 74 described previously. The remaining components of the cartridge body are operatively secured to each of the arms 120, 122, namely the transition piece 76b, the intermediate piece 78b and terminal part 80b, forming respective propellant-receiving chambers 88b. Identical propellant bodies 90b are located within each of the chambers 88b, with the extensions 92b thereof threadably received within the bores of the legs 120, 122.

In the use of assembly 10b, the propellant charges within each of the bodies 90b are simultaneously ignited, thereby causing gaseous products of combustion from both of these charges to pass downwardly through yoke coupler 114b so as to drive the piston 72b downwardly within the housing 56b. This of course moves the associated gate member as described.

FIG. 7 depicts another embodiment 124 of the invention which is similar in many respects to that illustrated in FIG. 1. That is, the valve 124 includes a valve body 126 and gate unit 128 identical to the valve body 12 and gate unit 16 previously described. In this case, the actuator 130 is very similar to the actuator 20, but is oriented in axial alignment with the gate valve 128. In addition, the actuator 128 is equipped with an outboard, threaded adapter 132 received within a correspondingly threaded boss 134. An elongated, tubular, threaded extension 136 is received within the adapter 132 as shown, and supports a hollow metallic housing 138, the latter having tubular end fittings 140, 142. The ignition wires 144 associated with the actuator 130 extend through the adapter 132 and extension 136 into the confines of housing 138. These wires then extend through the fittings 140, 142 for appropriate connection to a sensor and power source as required. As will be readily apparent from a study of FIG. 7, the remaining structure of the actuator 130, and the overall valve 124, are identical with the corresponding structure of FIG. 1, and the operation of the valve is essentially identical as well. However, the provision of the housing 138 and its associated support structure adds a measure of safety to the operation of the valve, by encasing the ignition wires 144 so as to prevent environmental contamination and/or degradation thereof.

FIG. 8 illustrates a valve 146 which is identical with valve 126 of FIG. 7, except that a pair of juxtaposed actuators 130 are employed in lieu of the single actuator of FIG. 7. Here again, use is made of the bosses 134, adapters 132 and extensions 136, in order to support a appropriately sized housing 148 which receives the ignition wire sets 144 from each of the actuators 130. As shown, the housing 148 has tubular end fittings 150, 152 so that the ignition wires may be connected as indicated previously. In all other respects, the valve 140 corresponds to the valve 126.

A preferred form of the gate valve assembly as shown in FIGS. 9 and 10 is designated by the numeral 210. The valve assembly 210 has many components which are the same or similar to elements of valve assembly 10 as depicted in FIGS. 1 and 5. Specifically, the gate valve 212 has components which are the same, function the same, and operate the same as the components of valve body 12 previously described in connection with valve assembly 10 FIGS. 1–4.

An actuator 220 includes a tubular housing made up of a cylinder 256 which houses a reciprocable piston 272 attached to a piston rod 271 that is connected directly to the plate 224 that serves as the gate valve. Plate 224 has a circular opening 214 therein of the same diameter as the aligned passages 228 and 229 in flanges 242 and 244, respectively, of the gate valve 212.

As best shown in FIG. 10, the actuator 216 has a top fixture 260 connected directly to the upper circular edge of cylinder 256. Fixture 260 has an irregularly configured passage 262 therethrough communicating with the interior of cylinder 256 and which mounts a gas cartridge actuator unit 222 that is of the same construction as cartridge unit 22 previously described. The propellant formulation of cartridge unit 222 is a combination of potassium perchlorate, nitroglycerin, nitrocellulose and lead thiocyanate, as previously described and has the same properties and specification referred to with respect to cartridge unit 22.

The proportion of constituents of the propellant formulation, the quantities thereof, and the burn rate are correlated such that upon burning of the propellant, when the hot products of combustion of the propellant burning are directed into a test vessel having a volume of 32 cc's, a measured pressure of from 4,500 to about 5,400 psig results. Furthermore, the composition of the propellant and the rate of burn of that propellant are coordinated such that the flow rate of products of combustion directed into housing 256 from the cartridge unit upon ignition of the propellant remains subsonic and therefore does not exceed mach 1. A suitable gas cartridge actuator is supplied by Fike Corporation, Blue Springs, Mo., as part No. 02-4134.

It is also to be observed from FIG. 9 that the piston 272 in its initial location in closest proximity to the fixture 260 is in direct facing relationship to the discharge end 263 of cartridge unit 222. Furthermore, the face 272a of piston 272 which faces fixture 260, and the surface 260a of fixture 260 cooperate to define a pressurized gas-receiving, expandable chamber 280.

A housing 282 for electrical control components is mounted on the outer end of the cartridge unit 222 which preferably contains an electrical release module that is electrically connected to the initiator forming a part of the unit 222. When an electrical signal is received for triggering of the gate valve to either open or close the passage therethrough, the electrical resistance initiator wires are caused to conduct electrical current, thus creating sufficient heat to ignite the initiator charge which in turn ignites the propellant mixture in the cartridge unit.

In preferred embodiments of the isolation valve of this invention, the piston and cylinder assembly made up of tubular housing 256 and piston 272 preferably employ a piston having a diameter of 3 inches for use in piping having a diameter of 2 inches, 3 inches, 4 inches, 6 inches, 8 inches, and 10 inches, while isolation valves for use in piping systems in which the pipes have a diameter 12 inches, 14 inches, 16 inches, 18 inches, 20 inches, and 24 inches, for example, desirably employ a piston and enclosing housing wherein the piston has a diameter of 4 inches. Essentially the same relationship should be maintained in gate valve apparatus for use in respective equivalent diameter piping in metric dimensions. It is to be appreciated in this respect that the gate valve apparatus is constructed and dimensioned such that the gate valve 24 or 224 is shifted through a displacement adequate to effect opening or closing of the orifice in the pipeline as the case may be. Thus, in the instance of a 2 in. valve, the valve plate must moved through a displacement of at least 2 ins., while the valve plate must be moved through a displacement of at least 24 ins. for a 24 in. pipe. Proportional displacement of the valve plate is required for other pipe sizes.

As observed in FIGS. 1 and 10, for example, each gate valve apparatus of this invention regardless of its size depending upon the diameter of the piping in which the gate valve apparatus is to be used, is constructed such that there is space between the face of the piston and the adjacent gas discharge end of the cartridge 22 or 222. This spacing, which at a minimum should be at least about ¼ in. in the embodiment of the invention illustrated in FIG. 10, ensures that the gas discharged from the outlet orifice of the gas producing cartridge 22 or 222 spreads uniformly over the adjacent face of the piston to thereby initiate movement of the piston and consequent shifting of the gate valve member or plate 18 or 224. If for example piston 272 in its initial home position directly engaged the outlet orifice of the cartridge 222, the gaseous products of combustion discharged from the latter would not be uniformly dispersed over the face of the piston 272 and shifting of the gate member or plate 224 would not be of required progressive, controlled acceleration. It can be therefore seen that in all embodiments of the invention, a space is provided between the cartridge 22 or 222 and the piston 72 or 272.

The space that is provided between the face of the piston 72 or 272 and an associated cartridge 22 or 222 serves to modulate the pressurized gas exiting from the gas generating cartridge against the adjacent face of the piston and thereby prevent untoward initial forces being imposed on the piston immediately after actuation of the cartridge. It has been found that by varying the volume of that space between the cartridge and the piston depending upon the size of the gate valve apparatus, required control over acceleration of the piston and the gate valve member connected thereto can be closely and advantageously controlled to assure that the speed of operation is maintained within the required parameters as noted above. Thus, if a particular application requires a larger initial space between the cartridge and the adjacent face of the piston, that can readily be accomplished by providing a cylinder of longer overall length, thus allowing the piston to be positioned in greater spaced relationship from the cartridge in the non-actuated location of the piston to increase the initial spacing between the piston face and the gas generating cartridge.

For example, in the case of gate valve apparatus sized for a 2 in. pipe, it has been found that it is desirable to use a 3 in. diameter piston as noted in a cylinder of a length such that although it has a piston displacement of only 2 in., there is an approximately 4 in. initial space between the piston and the housing for the cartridge, thus providing a pressurized gas modulating zone above the piston. An additional approximately 2 in. initial space beyond the minimum ¼ in. space between the piston and gas cartridge has been found to be adequate in gas cartridge actuated isolation valve apparatus sized for 3 in., 4 in., 6 in. and 8 in. piping. The minimum ¼ in. initial space between the piston and the gas cartridge in the initial position of the piston has proved to be sufficient for gas cartridge actuated valve apparatus sized to be used in 10 in, 12 in., 14 in. and 16 in. valves. An additional approximately 2 in. initial space has been determined to be adequate for valve apparatus for 20 in. piping.

Best results have been obtained by using two gas generating cartridges 22 or 222 as depicted for example in FIG. 6 or FIG. 8, in gate valve apparatus of this invention sized for 12 in. or greater diameter piping.

In an exemplary isolation valve for use in a six inch pipeline, the propellant charge should preferably be formulated to produce gaseous products of combustion directed into a 3 inch diameter actuator 220 that cause the gate valve plate 224 to move to its fully actuated position in a time interval of about 18 msec, with the pressure relatively uniformly declining during that time from a pressure of about 600 psig to about 0.

We claim:

1. In an isolation gate valve assembly having a valve body presenting a passageway therethrough, a gate unit including a shiftable gate member proximal to said passageway and shiftable between a valve open position permitting flow through the passageway and a valve closed position wherein the gate member is located in flow-blocking orientation relative to said passageway, an improved actuator for shifting the gate member between said positions, said actuator comprising:

an elongated tubular housing;

a piston shiftable longitudinally of the housing;

a piston rod connected to the piston and to the gate member for shifting the gate member between said valve open position and said valve closed position in response to movement of the piston, a gas generating cartridge unit having a gas discharge end, the cartridge being connected to the tubular housing in disposition defining an expandable pressurized gas-receiving chamber between the piston and the gas discharge end of the cartridge, said cartridge being provided with an ignitable gas generating charge which upon ignition burns at a controlled rate producing a flow of pressurized gaseous products of combustion which flow into the chamber at a rate that does not exceed a velocity of about mach 1, the piston being positioned for movement from an initial location adjacent to but spaced from the discharge end of the cartridge to an actuated location, by pressurized gas directed into said chamber from the gas cartridge to effect shifting of the gate member from one position thereof to the other position of the same, the piston in said initial position thereof being spaced from the discharge end of the cartridge a distance sufficient to prevent pressurized gas first entering the chamber upon ignition of the charge from imparting damaging shock forces to the piston, said rod connected thereto, or the gate valve, the gas generating charge being operable to move the piston and thereby the gate member from the initial location of the piston to said actuated location thereof at a velocity of from about 0.2 to about 0.33 in./msec.

2. An assembly as set forth in claim 1, wherein is provided a dampener unit positioned to be engaged by the gate member when the piston approaches its actuated location to effect controlled, predetermined deceleration of the gate member.

3. An assembly as set forth in claim 2, wherein said dampener unit is an elastomeric element having a Shore A hardness of from about 60 to about 70.

4. An assembly as set forth in claim 2, wherein said dampener unit is a honeycomb cellular member oriented in disposition with the axes of the cells thereof in generally parallel relationship to the path of travel of the gate member causing the cellular member to be crushed and decelerate the gate member as it moves to its actuated position.

5. An assembly as set forth in claim 1, said cartridge unit comprising an elongated cartridge body, said cartridge body oriented in transverse relationship to said housing.

6. An assembly as set forth in claim 1, said cartridge unit comprising an elongated cartridge body, said cartridge body oriented in substantial alignment with said housing.

7. An assembly as set forth in claim 1, wherein is included a plurality of said gas-generating cartridge units, all of said units being in direct, facing communication with the chamber.

8. An assembly as set forth in claim 1, said cartridge unit comprising an elongated cartridge body, said cartridge body oriented in transverse relationship to said housing.

9. An assembly as set forth in claim 1, wherein is provided a control device for the cartridge unit, said control device being mounted on the tubular housing in direct association with the cartridge unit.

10. A method of selectively actuating an isolation gate valve assembly having a valve body presenting a passageway therethrough, a gate unit including a shiftable gate member proximal to said passageway and shiftable between a valve open position permitting flow through the passageway and a valve closed position wherein the gate member is located in flow-blocking orientation relative to said passageway, an improved actuator for shifting the gate member between said positions, said method comprising the steps of:

generating a charge of pressurized gas which has a velocity that does not exceed about mach 1; and causing said charge of pressurized gas to effect shifting of the gate member at a velocity of about 0.2 to about 0.33 in./msec.

11. In an isolation gate valve assembly having a valve body presenting a passageway therethrough, a gate unit including a shiftable gate member proximal to said passageway and shiftable between a valve open position permitting flow through the passageway and a valve closed position wherein the gate member is located in flow-blocking orientation relative to said passageway, and a dampener unit adjacent said passageway and positioned to be engaged by said gate member upon said shifting thereof between said positions in order to effect controlled deceleration of the gate member, the improvement which comprises a dampener unit including a honeycomb cellular member oriented in disposition with the axes of the cells thereof in generally parallel relationship to the path of travel of the gate member during said shifting thereof whereby said cellular member is crushed upon engagement thereof by the gate member in order to decelerate the gate member.

12. The assembly of claim 11, including an actuator for shifting said gate member between said positions, said actuator comprising a gas generating cartridge unit having a gas discharge end, the cartridge being connected to said body for generating a charge of pressurized gas, said gate member responsive to said charge of pressurized gas to effect said shifting of said gate member.

13. The assembly of claim 12, said cartridge unit including a gas generating charge which upon ignition burns at a controlled rate producing a flow of pressurized gaseous products of combustion which flow into said body at a rate that does not exceed a velocity of about mach 1.

14. The assembly of claim 13, said charge being operable to shift said gate member at a velocity of from about 0.2 to about 0.33 in/msec.

* * * * *